April 20, 1926.
L. J. COLE
1,581,388
DEVICE FOR LOCKING BRAKE BANDS IN PLACE
Filed Jan. 23, 1925
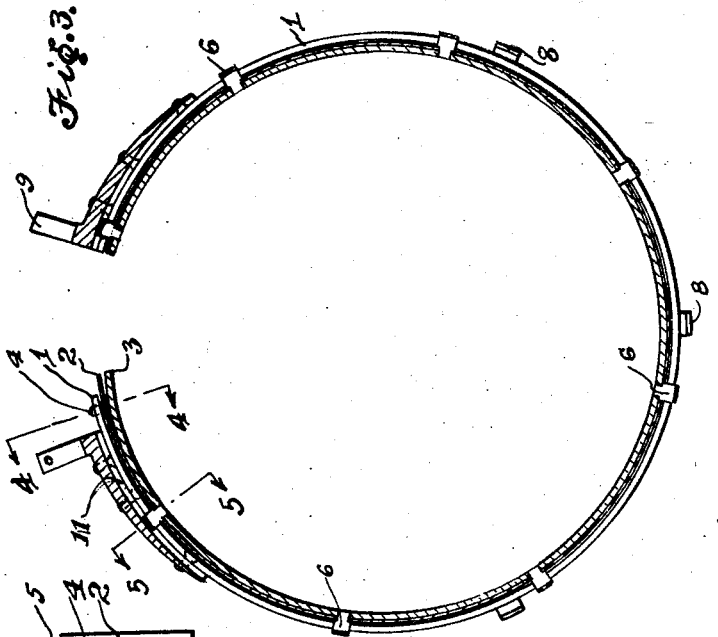
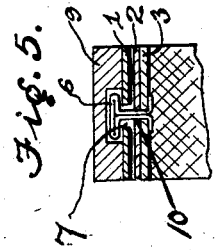
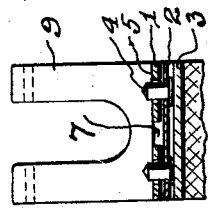
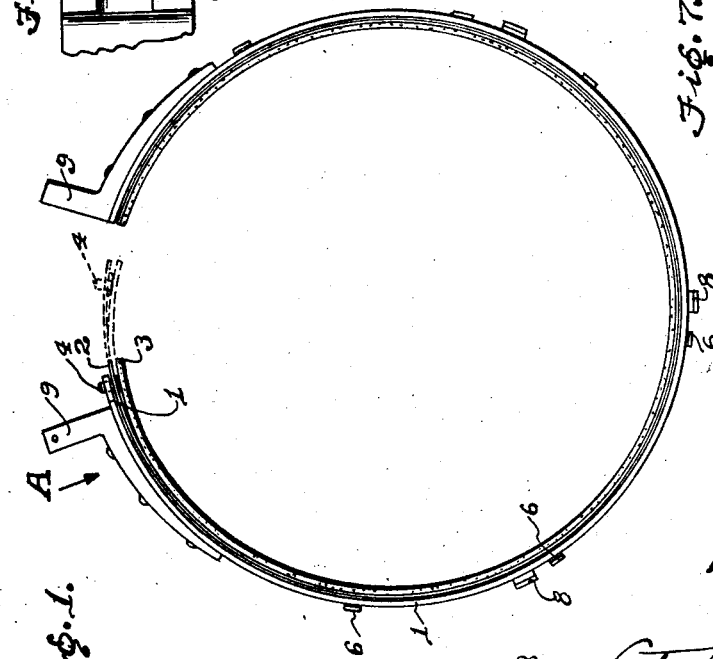
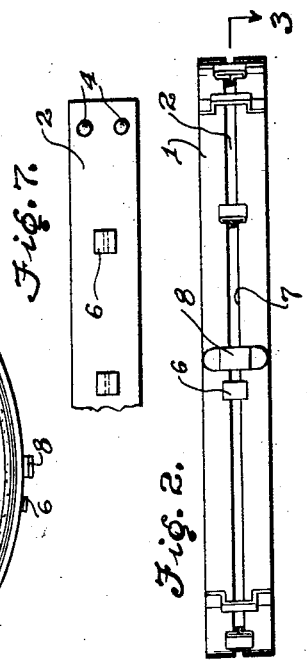
Inventor
L. J. Cole
By Lester L. Sargent
Attorney Patented Apr. 20, 1926.

1,581,388

UNITED STATES PATENT OFFICE.

LEONARD J. COLE, OF BUFFALO, NEW YORK.

DEVICE FOR LOCKING BRAKE BANDS IN PLACE.

Application filed January 23, 1925. Serial No. 4,224.

*To all whom it may concern:*

Be it known that I, LEONARD J. COLE, a citizen of the United States, residing at Buffalo, in the county of Erie and State of New York, have invented a Device for Locking Brake Bands in Place, of which the following is a specification.

The object of my invention is to provide novel means for removably locking a brake band in place whereby the brake band may be readily removed and replaced when the brake lining is worn to such an extent as to interfere with its usefulness; and to provide novel means for detachably interlocking the renewable lining with the metal brake band.

I attain these and other objects of my invention by the mechanism illustrated in the accompanying drawings, in which—

Figure 1 is a side elevation of my invention, the mode of removing the brake band lining being indicated in dotted lines;

Fig. 2 is a bottom plan view of the exterior of the brake band;

Fig. 3 is a longitudinal section on line 3—3 of Fig. 2;

Fig. 4 is a transverse section on line 4—4 of Fig. 3;

Fig. 5 is a transverse section on line 5—5 of Fig. 3;

Fig. 6 is a detail top plan view of members 2, 4 and 5; and

Fig. 7 is a detail top plan view of members 2, 4 and 6.

Like numerals indicate like parts in each of the several views.

Referring to the accompanying drawings, I provide a metal brake band 1 having a longitudinal slot 7 encircling same as shown in Fig. 2, the band being reinforced on the outside by the strips 8, preferably shaped as shown in Fig. 2. The brake band 1 is provided with the usual brake ears 9 arranged as shown in Figs. 1 and 2. One of the brake ears is spaced from the end of the brake band. I provide a flexible inner metallic band or backing strip 2 having locking strips 4. I also provide a fabric lining 3 as shown in Figs. 1 and 3.

I provide clips 6 which are inserted from the slot 7 and through bands 2 and 3 to removably secure the brake lining and inner band in place in the manner illustrated in Figs. 3 and 5. I provide a groove 11 in ears 9 to allow the head of clips 6 to pass therethrough.

To remove the brake band lining when it becomes worn the end of member 2 which carries the locking studs 4 and which normally projects slightly beyond the adjacent end of the metal brake band 1 is pressed inwardly to disengage the locking stud 4 from the apertures 5 in band 1 in which they are normally in locking engagement and inner band 2 and brake lining 3 are pulled outwardly until they are completely disengaged from the brake band 1. In replacing a new brake lining a reverse operation is carried out, the studs 4 locking the brake lining in place and the clips 6 fastening the lining to the inner band 2, which is provided with suitable apertures 10 to permit of the fastening of the clips, as described, and as shown in Fig. 5. The studs 4 hold or lock the inner removable band 2 to the outer brake band 1, thereby preventing any movement between the two when in assembled position, as shown in the drawings. The positioning of the locking of the pins 4 to engage the brake band 1 at a point outward of the adjacent slotted coupling pins 9, is important because they are readily available in this position when it is necessary to release them to remove the brake band lining.

What I claim is:

1. A brake band of the character described, comprising a supporting band having a circumferential guide-way and openings near one end thereof and outward of the usual slotted coupling brake band ears, a removable lining member removable circumferentially of said supporting member, and having studs arranged to detachably interlock the said supporting band openings at a point outward of the usual coupling ears, said studs being rigidly fixed to the removable lining member.

2. In a device of the class described, the combination of a brake band having one of the usual slotted coupling ears spaced from the end thereof and having apertures forward of the said coupling ears, a readily removable lining member removable circumferentially on said brake band, said lining member having pins integral with the lining member and positioned to engage the brake band at a point in advance of the above-mentioned slotted coupling ears for detachably engaging the apertured end of the brake band to permit of convenient removal and replacement of the lining member.

LEONARD J. COLE.